United States Patent
Srinivasan et al.

(10) Patent No.: US 12,047,241 B2
(45) Date of Patent: Jul. 23, 2024

(54) IDENTIFYING AN INSTANCE OF A VIRTUAL NETWORK FUNCTION

(71) Applicant: Telefonaktiebolaget LM Ericsson (PUBL), Stockholm (SE)

(72) Inventors: Umakanth Srinivasan, Chennai (IN); Madhusudhan Bannur, Athlone (IE); Rajavarma Bhyrraju, Athlone (IE); Dhamayanthi Karuppanan, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/791,631

(22) PCT Filed: Feb. 5, 2020

(86) PCT No.: PCT/EP2020/052905
§ 371 (c)(1),
(2) Date: Jul. 8, 2022

(87) PCT Pub. No.: WO2021/155924
PCT Pub. Date: Aug. 12, 2021

(65) Prior Publication Data
US 2023/0041981 A1    Feb. 9, 2023

(51) Int. Cl.
*H04L 41/0895* (2022.01)
*H04L 41/0806* (2022.01)

(52) U.S. Cl.
CPC ...... *H04L 41/0895* (2022.05); *H04L 41/0806* (2013.01)

(58) Field of Classification Search
CPC ............. H04L 41/0895; H04L 41/0806; H04L 12/4625
See application file for complete search history.

(56) References Cited

U.S. PATENT DOCUMENTS 10,361,843 B1 * 7/2019 Suthar ................. G06Q 20/065
10,545,779 B2 * 1/2020 Gokurakuji ......... H04L 41/0806
(Continued)

FOREIGN PATENT DOCUMENTS

EP    3 253 005 A1    12/2017

OTHER PUBLICATIONS

ETSI GS NFV-SOL 003 v2.6.1; Network Functions Virtualisation (NFV) Release 2; Protocols and Data Models; RESTful protocols specification for the Or-Vnfm Reference Point—Apr. 2019.
(Continued)

*Primary Examiner* — Michael Won
(74) *Attorney, Agent, or Firm* — Baker Botts L.L.P.

(57) ABSTRACT

Methods and apparatus relating to identifying an instance of a virtual network function are provided. In one aspect, a method performed by a Network Functions Virtualisation Orchestrator is provided. The method comprises receiving, from a Virtual Network Function Manager (VNFM) identifying information for at least one Virtual Network Function, VNF, instance instantiated at the VNFM, wherein the identifying information is received from the VNFM in response to registration of one of the NFVO and the VNFM at the other of the NFVO and the VNFM. The method further comprises creating a record at the NFVO for the at least one VNF instance identified by the VNFM.

22 Claims, 5 Drawing Sheets

(56) References Cited

U.S. PATENT DOCUMENTS

| | | | |
|---|---|---|---|
| 2018/0191581 A1* | 7/2018 | Yu | H04L 41/042 |
| 2018/0191637 A1* | 7/2018 | Yang | H04L 41/0897 |
| 2018/0309646 A1 | 10/2018 | Mustafiz et al. | |
| 2018/0316543 A1* | 11/2018 | Hwang | H04L 41/5003 |
| 2018/0324261 A1* | 11/2018 | Yi | H04L 67/51 |
| 2019/0052528 A1* | 2/2019 | Yoshimura | H04L 41/0813 |
| 2019/0089588 A1* | 3/2019 | Xu | H04L 49/253 |
| 2019/0104022 A1* | 4/2019 | Power | H04L 43/20 |
| 2019/0140895 A1* | 5/2019 | Ennis, Jr. | G06F 9/54 |
| 2019/0149408 A1* | 5/2019 | Li | H04L 41/40 709/223 |
| 2019/0149434 A1* | 5/2019 | Chou | H04L 41/0813 370/254 |
| 2019/0166017 A1* | 5/2019 | Chou | H04L 43/065 |
| 2019/0199760 A1 | 6/2019 | Arauz-Rosado | |
| 2019/0260636 A1* | 8/2019 | Sun | H04L 41/0895 |
| 2020/0044919 A1* | 2/2020 | Yao | H04L 41/0806 |
| 2020/0259712 A1* | 8/2020 | Jonnalagadda | H04L 41/0843 |
| 2020/0409743 A1* | 12/2020 | Ni | H04L 41/0806 |
| 2021/0044481 A1* | 2/2021 | Xu | H04W 72/02 |
| 2022/0116286 A1* | 4/2022 | Doshi | H04L 41/5032 |

OTHER PUBLICATIONS

ETSI GR NFV-IFA 021 v3.1.1; Network Functions Virtualisation (NFV) Release 3; Management and Orchestration; Report on management of NFV-MANO and automated deployment of EM and other OSS functions—Jan. 2018.

PCT Notification of Transmittal of the International Search Report and the Written Opinion of the International Searching Authority, or the Declaration issued for International application No. PCT/EP2020/052905—Oct. 22, 2020.

\* cited by examiner

300

IDENTIFYING AN INSTANCE OF A VIRTUAL NETWORK FUNCTION

PRIORITY

This nonprovisional application is a U.S. National Stage Filing under 35 U.S.C. § 371 of International Patent Application Serial No. PCT/EP2020/052905 filed Feb. 5, 2020 and entitled "IDENTIFYING AN INSTANCE OF A VIRTUAL NETWORK FUNCTION" which is hereby incorporated by reference in its entirety.

TECHNICAL FIELD

Examples of the present disclosure relate to identifying an instance of a virtual network function.

BACKGROUND

In physical networks, network functions are often implemented as a combination of vendor-specific software and hardware, referred to as network nodes or network elements. In virtualised networks, software is decoupled from hardware, which means that infrastructure resources can be shared and reassigned. Virtual networks may thus comprise one or more virtual network functions (VNFs), each of which is an implementation of an executable software program that constitutes the whole or a part of a network function and can be deployed on virtualisation infrastructure.

The provision of network services by VNFs in the virtual network may be facilitated by a Network Functions Virtualisation Orchestrator (NFVO). The NFVO conducts the orchestration and management of network functions virtualisation infrastructure (NFVI) and is responsible for network service management including, for example, instantiating, scaling, updating and terminating network services. The NFVO may also support VNF lifecycle management, together with one or more VNF Managers (VNFMs). A VNFM is responsible for VNF lifecycle management including, for example, instantiating, updating, querying, scaling and terminating VNFs.

The management of VNFs thus requires cooperation between the NFVO and any VNFMs in the virtual network. However, when a new NFVO is deployed in a virtual network that already has a VNFM, the new NFVO may not be aware of any VNFs that have already been instantiated at the VNFM.

SUMMARY

One aspect of the present disclosure provides a method performed by a Network Functions Virtualisation Orchestrator (NFVO). The method comprises receiving, from a Virtual Network Function Manager (VNFM), identifying information for at least one Virtual Network Function, VNF, instance instantiated at the VNFM, wherein the identifying information is received from the VNFM in response to registration of one of the NFVO and the VNFM at the other of the NFVO and the VNFM. The method further comprises creating a record at the NFVO for the at least one VNF instance identified by the VNFM.

In a further aspect, the present disclosure provides an NFVO configured to perform the aforementioned method.

The present disclosure also provides a computer program comprising instructions which, when executed on at least one processor, cause the at least one processor to carry out the aforementioned method. In a further aspect, the present disclosure provides a carrier containing the aforementioned computer program, wherein the carrier comprises one of an electronic signal, optical signal, radio signal or computer readable storage medium. In another further aspect, the present disclosure provides a computer program product comprising non transitory computer readable media having stored thereon the aforementioned computer program.

A still further aspect of the present disclosure provides an NFVO. The NFVO comprises a processor and a memory, in which the memory contains instructions executable by the processor such that the NFVO is operable to receive, from a VNFM, identifying information for at least one VNF instance instantiated at the VNFM, wherein the NFVO is operable to receive the identifying information from the VNFM in response to registration of one of the NFVO and the VNFM at the other of the NFVO and the VNFM; and create a record at the NFVO for the at least one VNF instance identified by the VNFM.

An additional aspect of the present disclosure provides a method performed by a VNFM. The method comprises sending, to an NFVO, identifying information for at least one VNF instance instantiated at the VNFM in response to registration of one of the NFVO and the VNFM at the other of the NFVO and the VNFM.

In a further aspect, the present disclosure provides a VNFM configured to perform the aforementioned method.

In a still further aspect, the present disclosure provides a computer program comprising instructions which, when executed on at least one processor, cause the at least one processor to carry out the aforementioned method. In a further aspect, the present disclosure provides a carrier containing the aforementioned computer program, wherein the carrier comprises one of an electronic signal, optical signal, radio signal or computer readable storage medium. In another further aspect, the present disclosure provides a computer program product comprising non transitory computer readable media having stored thereon the aforementioned computer program.

Another further aspect of the present disclosure provides a VNFM. The VNFM comprises a processor and a memory, in which the memory contains instructions executable by the processor such that the VNFM is operable to send, to an NFVO, identifying information for at least one VNF instance instantiated at the VNFM in response to registration of one of the NFVO and the VNFM at the other of the NFVO and the VNFM.

The solution in embodiments of the present disclosure provide the advantages of automating the discovery process and make the NFV MANO Units intelligent enough to find new VNF's for discovery. NFVOs and VNFMs compliance with this solution will enable the Telecom Service Providers and Enterprise customers to mix and match the NFVOs and VNFMs from different vendors and still have discovery feed technique automated. In consequence, product vendors will not have to spend time and effort to specify manually the VNF's to be discovered.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
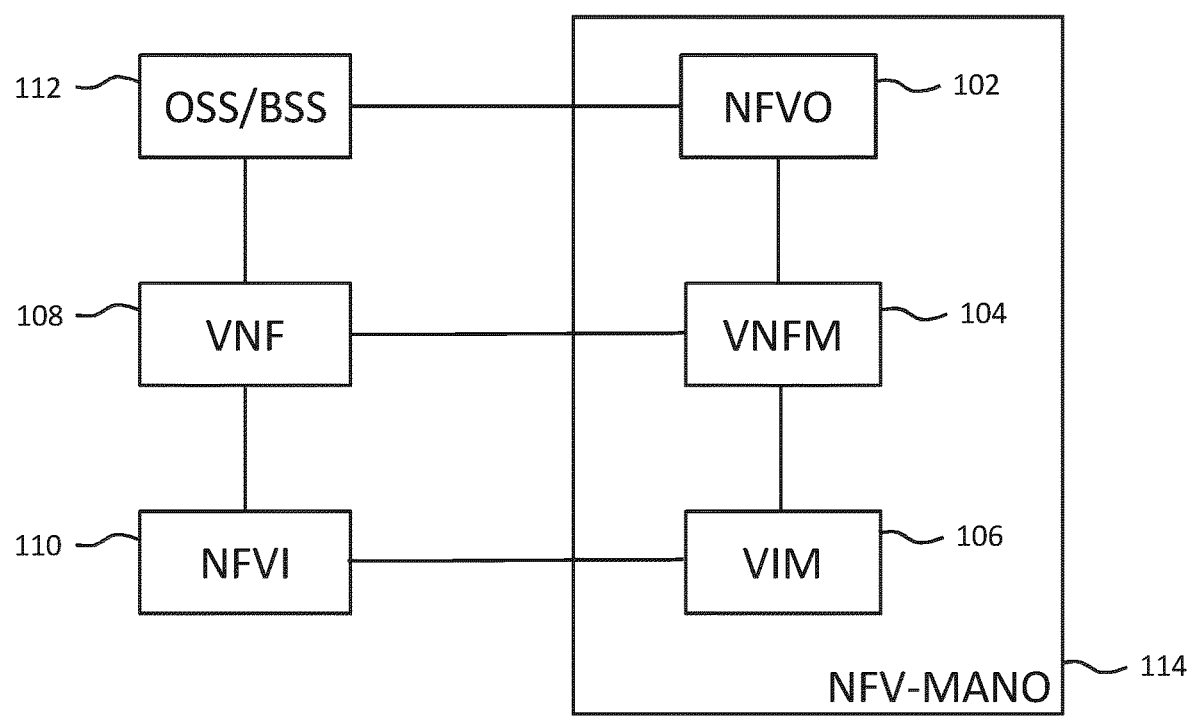
FIG. 1 illustrates a system according to an example of the disclosure.

FIG. 1 shows an example of a system 100 comprising a network function virtualisation management and orchestration framework (NFV-MANO) 114, a virtual network function (VNF) 108, a Network Functions Virtualisation Infrastructure (NFVI) 110 and an operations support system or business support system (OSS/BSS) 112.

Only one VNF 108 is shown, although the skilled person will appreciate that the system 100 may comprise many more VNFs 108. A VNF referred to herein can be any implementation of a network function that can be deployed using software virtualisation techniques. A network function can be any functional building block within a network infrastructure. A functional building block may, for example, be a block within a network infrastructure that has well-defined external interfaces and a well-defined functional behaviour. In practical terms, a network function may, for example, be a network node, a physical appliance, or any other type of network function.

The NFVI 110 comprises resources upon which VNFs (such as the VNF 108) may be deployed. Thus, for example, the NFVI 110 may comprise one or more of: virtualisation software, hardware and system management software.

The NFV-MANO 114 coordinates resources and manages the lifecycle of VNFs 108 in the system 100. As illustrated, the NFV-MANO 114 comprises a Network Function Virtu-alisation Orchestrator (NFVO) 102, a Virtual Network Function Manager (VNFM) 104 and a Virtualisation Infrastructure Manager (VIM) 106.

The NFVO 102 conducts the orchestration and management of NFVI and software resources, and is responsible for realising network services on NFVI. This may include, for example, on-boarding, instantiating, scaling, updating and terminating network services. For example, on receiving a request to instantiate a network service (e.g. from the OSS/BSS 112), the NFVO 102 may determine whether a VNF instance satisfying the requirements for providing the service has already been instantiated at the VNFM 104. If the VNF instance has been instantiated, it may be used to deliver the requested service. If the VNF instance has not already been instantiated, the NFVO 102 may initiate instantiation of the VNF instance at the VNFM 104.

The VIM 106 controls and manages virtualisation infrastructure (e.g. the NFVI 110), including, for example computing, storage and networking resources. The VIM 106 may thus, for example, manage a repository of hardware and software, monitor resource usage, monitor and manage network connections and/or provide resource information to other nodes in the system 100.

Together with the NFVO 102, the VNFM 104 is responsible for lifecycle management for VNFs in the system (such as the VNF 108). This may include, for example, instantiating, scaling, updating and terminating VNFs. Although only one VNFM 104 is shown, the skilled person will appreciate that the system 100 may comprise one or more VNFMs.

The NFVO 102 and the VNFM 104 may thus cooperate to manage the lifecycle of the VNF 108. However, situations may arise in which an NFVO may be deployed in a system with an existing VNFM. For example, an NFVO may be deployed in a system that lacks an NFVO or a new NFVO may be deployed to replace an existing an NFVO.

In these situations, registration between the NFVO and the VNFM may be performed in order to establish an interface between the NFVO and the VNFM.

Registration may be a manual process. For example, an operator or a user may configure the NFVO with registration information for the VNFM and configure the VNFM with registration information for the NFVO.

Alternatively, the VNFM may register the NFVO by receiving one or more messages comprising registration information for the NFVO. The messages may be received from the NFVO, for example. Similarly, the NFVO may register the VNFM by receiving one or more messages comprising registration information for the VNFM (e.g. from the VNFM).

The registration information for the VNFM may comprise information enabling the NFVO to contact the VNFM. Similarly, the registration information for the NFVO may comprise information enabling the VNFM to contact the NFVO. For example, the registration information for the NFVO may comprise an Internet Protocol (IP) address and/or a port for the NFVO.

Therefore, the NFVO may be considered to be registered at the VNFM when the VNFM obtains the registration information for the NFVO. Similarly, the VNFM may be considered to be registered at the NFVO when the NFVO obtains the registration information for the VNFM.

As described above, registration between the NFVO and the VNFM may establish a reference point between the NFVO and the VNFM on which one or more interfaces may be exposed. However, even once an NFVO has registered a VNFM, the NFVO may not be aware of any VNFs that have already been instantiated at the VNFM, which means that the NFVO and the VNFM may not be able to effectively cooperate to manage the lifecycle of VNFs that are already instantiated at the VNFM.

The disclosure provides methods and apparatus for addressing these and other problems. In one aspect, the disclosure provides a method performed by an NFVO. The method comprises receiving, from a VNFM, identifying information for at least one VNF instance instantiated at the VNFM, wherein the identifying information is received from the VNFM in response to registration of one of the NFVO and the VNFM at the other of the NFVO and the VNFM. The method further comprises creating a record at the NFVO for the at least one VNF instance identified by the VNFM.

The present disclosure thus provides a method for identifying existing instances of VNFs that have already been instantiated at the VNFM to the NFVO. This enables efficient deployment of NFVOs in virtual networks, thereby improving the provision of services in virtual networks.

Figure 2:
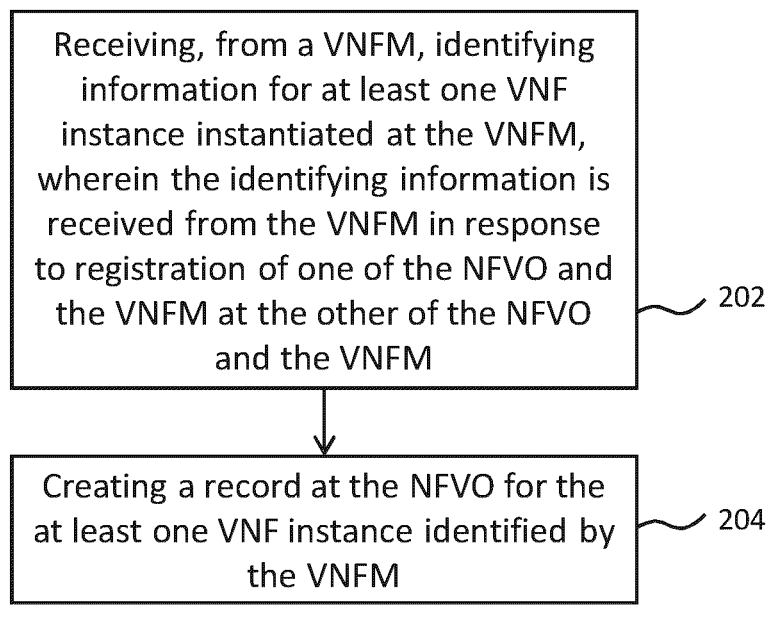
FIG. 2 is a flowchart of an example of a method performed by a Network Functions Virtualisation Orchestrator (NFVO)

FIG. 2 is a flowchart of an example of a method 200 performed by a NFVO. The method 200 may be, for example, performed by the NFVO 102 described above in respect of FIG. 1.

In step 202, the NFVO 102 receives, from a VNFM, identifying information for at least one VNF instance instantiated at the VNFM. The VNFM may be, for example, the VNFM 104 described above in respect of FIG. 1.

The identifying information may comprise, for example, a unique identifier for each of the at least one VNF instances instantiated at the VNFM 104 (e.g. a VNF Instance Identifier or VNF ID). The identifying information may further comprise supplementary information for the instance of the VNF, including, for example, one or more of: a name or type of the VNF, a creation time and/or date, an owner etc.

The identifying information may be comprised in a VnfIdentifierNotification message. An example format for the VnfIdentifierNotification is shown in Table 1. The skilled person will appreciate that the message may comprise any combination of the elements shown in Table 1.

TABLE 1

| Attribute Name | Data Type | Cardinality | Description |
| --- | --- | --- | --- |
| id | Identifier | 1 | Identifier of this notification. If a notification is sent multiple times due to multiple subscriptions, the "id" attribute of all these notifications shall have the same value. |
| notificationType | String | 1 | Discriminator for the different notification types. Shall be set to "VnfIdentifierNotification" for this notification type |
| subscriptionId | Identifier | 1 | Identifier of the subscription that this notification relates to. |
| timestamp | DateTime | 1 | Date-time of the generation of the notification. |
| vnfInstanceId | Identifier | 1 | The created VNF instance identifier. |
| links | LccnLinks | 1 | Links to resources related to this notification. |
| extensions | KeyValuePairs | 0 . . . N | VNF-Specific attributes that will help in discovery of the VNF at NFVO |

The identifying information for the at least one VNF instance is received from the VNFM 104 in response to registration of one of the NFVO 102 and the VNFM 104 at the other of the NFVO 102 and the VNFM 104.

Thus, the identifying information may be received in response to registration of the NFVO 102 at the VNFM 104. That is, the VNFM 104 may send the identifying information upon registration of the NFVO 102 at the VNFM 104.

Alternatively, the identifying information may be received in response to registration of the VNFM 104 at the NFVO 102. In particular aspects, the NFVO 102 may, in response to registration of the VNFM 104 at the NFVO 102, send a request to the VNFM 104 to identify one or more VNF instances that are instantiated at the VNFM 104. The NFVO may thus receive the identifying information in step 202 in in response to the VNFM 104 receiving the request from the NFVO 102.

The request may, for example, be sent over a lifecycle management (LCM) interface between the NFVO 102 and the VNFM 104. The interface may be compliant with ETSI GS NFV-SOL 003.

The request may be a request to identify all VNF instances that are instantiated at the VNFM 104. The NFVO 102 may thus, in step 202, receive identifying information for all the VNF instances that are instantiated at the VNFM 104.

Alternatively, the request may specify one or more filters (e.g. criteria) for VNF instances to be identified to the NFVO 102. The NFVO 102 may thus, in step 202, receive identifying information only for VNF instances that satisfy the one or more filters. The one or more filters may comprise any combination of suitable filters. In particular aspects, the one or more filters may comprise one or more of the following filters for the one or more VNF instances to be identified by the VNFM: a type of VNF, a VNF provider, a VNF version, a provider of the one or more VNF instances, a version of the one or more VNF instances, a version of a VNF description (VNFD) for the one or more VNF instances, and a service to be provided using the one or more VNF instances (e.g. identified by a product or service name). For example, the request may specify that the VNFM 104 is to identify any instances of an evolved packet gateway (EPG) that are instantiated at the VNFM 104. In which case, the NFVO 102 may receive, in step 202, identifying information for any EPG instances that are instantiated at the VNFM 104.

The request may be sent in one or more messages. For example, the NFVO 102 may send the VNFM 104 a first message requesting that the VNFM 104 identify one or more VNF instances that are instantiated at the VNFM 104 and a second message indicating one or more filters to be used by the VNFM 104.

The NFVO 102 thus receives identifying information for at least one VNF instance instantiated at the VNFM 104 in response to registration of one of the NFVO 102 and the VNFM 104 at the other of the NFVO 102 and the VNFM 104.

In particular aspects, the at least one VNF instances may have been instantiated at the VNFM 104 before the NFVO 102 registered at the VNFM 104. For example, the NFVO 102 may receive identifying information only for VNF instances that were instantiated at the VNFM 104 before registration of the NFVO 102.

In examples in which the NFVO 102 sends a request to the VNFM, the at least one VNF instances may be VNF instances that were instantiated at the VNFM 104 before the request was received by the VNFM 104. Thus, for example, the VNF instance may not include VNF instances that were instantiated at the VNFM 104 after the request was received.

In step 204, the NFVO 102 creates a record at the NFVO 102 for the at least one VNF instance identified by the VNFM 104. The NFVO 102 may generate a VNF record for each of the at least one VNF instances identified in the identifying information received from the VNFM 104. The record may comprise the identifying information received from the VNFM 104.

In particular aspects, creating a record at the NFVO 102 may comprise generating a VNF identifier to identify the at least one VNF instance at the NFVO. The NFVO 102 may configure the record with a mapping between the identifying information received from the VNFM 104 and the VNF identifier generated at the NFVO 102. Thus, the record may comprise both the VNF identifier and the identifying information. The VNF identifier generated at the NFVO may serve as a local identifier for the VNF instance (e.g. an identifier for the VNF instance as instantiated at the NFVO 102).

The NFVO 102 may thus receive identifying information for at least one VNF instance at the VNFM and create a record at the NFVO 102 for the identified VNF instance.

In particular aspects, the method 200 may further comprise receiving identifying information for a further VNF instance in response to the further VNF instance being instantiated at the VNFM 104. For example, the NFVO 102 may send a subscription request to the VNFM 104, requesting to receive identifying information whenever a new VNF instance is instantiated at the VNFM 104. The subscription request may be comprised in the request described above. Alternatively, the subscription request may be sent in another message. In either case, the NFVO 102 may receive identifying information for any further VNF instances as they are instantiated at the VNFM 104. The NFVO 102 is thus kept informed of any VNF instances that are instantiated at the VNFM 104, which enables the NFVO 102 to determine which services may be provided by VNF instances that have already been instantiated at the VNFM 104 without requiring any further signalling (e.g. to query the VNFM 104).

The NFVO 102 may use the identifying information for the at least one VNF instances to perform discovery for the at least one VNF instances. For example, the NFVO 102 may query the VNFM 104 and/or a VIM (such as the VIM 106 described above in respect of FIG. 1) for resource information relating to each of the at least one VNF instances that are instantiated at the VNFM 104.

Figure 3:
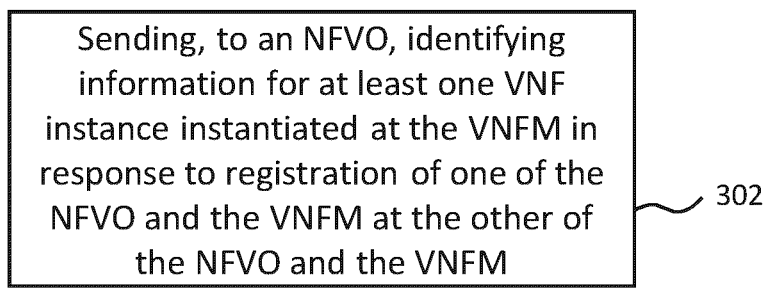
FIG. 3 is a flowchart of an example of a method performed by a Virtual Network Function Manager (VNFM)

FIG. 3 is a flowchart of an example of a method 300 performed by a VNFM. The method 300 may be, for example, performed by the VNFM 104 described above in respect of FIG. 1.

In step 302, the VNFM 104 sends, to an NFVO, identifying information for at least one VNF instance instantiated at the VNFM in response to registration of one of the NFVO and the VNFM 104 at the other of the NFVO and the VNFM 104. The NFVO may be, for example, the NFVO 102 described above in respect of FIG. 1.

The identifying information may be, for example, the identifying information described above with respect to FIG. 2. For example, the identifying information may be comprised in a VNFIdentifierNotification message as described above.

In some aspects, sending identifying information for at least one VNF instance instantiated at the VNFM 104 in response to registration of one of the NFVO 102 and the VNFM 104 at the other of the NFVO and the VNFM 104 may comprise sending the identifying information in response to registration of the NFVO 102 at the VNFM 104.

For example, the VNFM 104 may send the identifying information to the NFVO 102 in response to the VNFM 104 obtaining registration information for the NFVO 102.

The VNFM 104 may send the identifying information in response to registration of the VNFM 104 at the NFVO 102. For example, the VNFM 104 may send the identifying information in response receiving a message from the NFVO 102 indicating that the VNFM 104 is registered at the NFVO 102. The message may, for example, form part of a registration procedure between the NFVO 102 and the VNFM 104.

The VNFM 104 may send the identifying information in response to receiving a request, from the NFVO 102, to identify one or more VNF instances that are instantiated at the VNFM 104, wherein the request is received in response to registration of the VNFM 104 at the NFVO 102.

The request may be the request described above in reference to FIG. 2. Thus, for example, the request may be a request to identify all VNF instances that are instantiated at the VNFM 104. In which case, the VNFM 104 may send identifying information for all the VNF instances that are instantiated at the VNFM 104.

In an alternative example, the request may specify one or more filters for VNF instances to be identified to the NFVO 102. The VNFM 104 may thus send identifying information for only the VNF instances that are instantiated at the VNFM 104 that satisfy the filters. The one or more filters may be any combination of the filters described above in respect of FIG. 2.

The request may be received in one or more messages. For example, the VNFM 104 may receive a first message from the NFVO 102 requesting that the VNFM 104 identify one or more VNF instances that are instantiated at the VNFM 104 and a second message indicating one or more filters to be used by the VNFM 104.

In particular aspects, the at least one VNF instance may have been instantiated at the VNFM 104 before the VNFM 104 received the request from the NFVO 102. Thus, the VNFM may only identify VNF instances to the NFVO 102 that were instantiated at the VNFM 104 before the VNFM 104 received the request to identify one or more VNF instances.

In other aspects, the at least one VNF instance may have been instantiated at the VNFM 104 before the NFVO 102 registered at the VNFM 104. The VNFM 104 may send identifying information for at least one VNF instance that had already been instantiated at the VNFM before the VNFM 104 registered the NFVO 102. For example, the at least one VNF instance may have been instantiated at the VNFM 104 before the NFVO 102 was deployed and the VNFM 104 may only inform the NFVO 102 of VNF instances that were instantiated at the VNFM 104 before the NFVO 102 was deployed.

The method 300 may further comprise sending identifying information for a further VNF instance to the NFVO 102 in response to the further VNF instance being instantiated at the VNFM 104. The VNFM 104 may thus send identifying information, to the NFVO 102, for any newly instantiated VNF instantiated VNF instances as they are instantiated at the NFVO 102. For example, the VNFM 104 may receive a subscription request from the NFVO 102, requesting that the VNFM 104 sends identifying information whenever a new VNF instance is instantiated at the VNFM 104. The subscription request may, for example, be comprised in the request described above.

Aspects of the disclosure therefore provide methods for identifying, to an NFVO, an instance of a VNF that has already been instantiated at a VNFM. The skilled person will appreciate that the foregoing methods may, for example, form part of a registration process. For example, a registration process may be performed at or between the NFVO 102 and the VNFM 104 and one or more of the steps of the methods 200 and 300 may be performed as part of that process. Alternatively, one or more of the foregoing methods 200 and 300 may be performed in response to completion of a registration process between the NFVO 102 and the VNFM 104.

Figure 4:
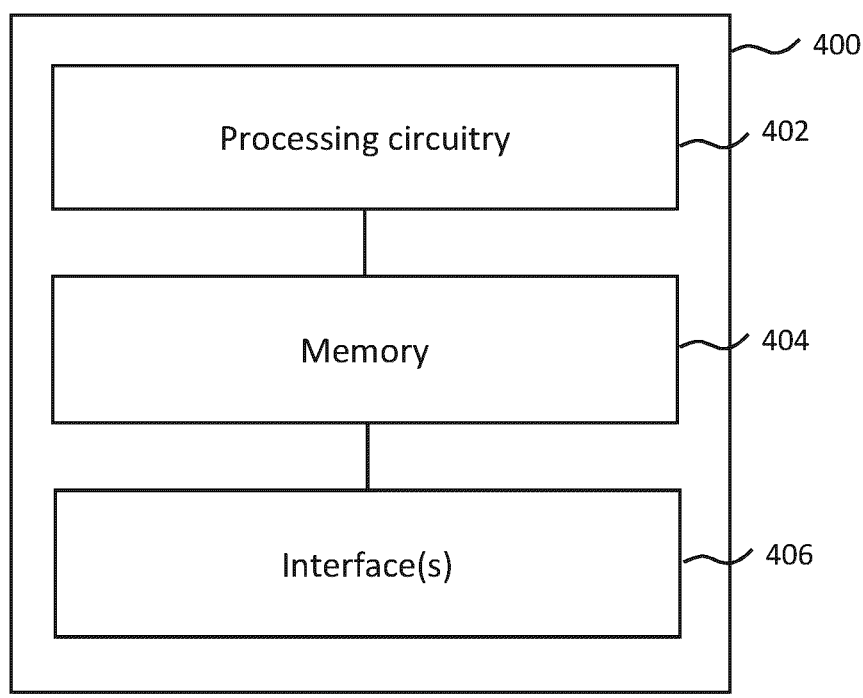
FIG. 4 is a schematic illustration of an example of an NFVO.

FIG. 4 shows a schematic diagram of an NFVO 400 according to embodiments of the disclosure. The NFVO 400 may be configured to perform the method 200 of FIG. 2. The NFVO 400 may be, for example, the NFVO 102 described above in respect of FIG. 1.

The NFVO 400 comprises processing circuitry (or logic) 402. The processing circuitry 402 controls the operation of the NFVO 400 and can implement the method 200 described above with respect to FIG. 2, for example. The processing circuitry 402 can comprise one or more processors, processing units, multi-core processors or modules that are configured or programmed to control the NFVO in the manner described herein.

In particular implementations, the processing circuitry 402 can comprise a plurality of software and/or hardware modules that are each configured to perform, or are for performing, individual or multiple steps of the method described herein in relation to the NFVO 400.

Briefly, the processing circuitry 402 of the NFVO 400 is operable to: receive, from a VNFM identifying information for at least one VNF instance instantiated at the VNFM, wherein the NFVO is operable to: receive the identifying information from the VNFM in response to registration of one of the NFVO and the VNFM at the other of the NFVO and the VNFM; and create a record at the NFVO for the at least one VNF instance identified by the VNFM Optionally, the NFVO 400 may comprise a machine-readable storage medium (e.g. a memory) 404. In some examples, the memory 404 of the NFVO 400 can be configured to store instructions (e.g. program code) that can be executed by the processing circuitry 402 of the NFVO 400 to perform the method described herein in relation to the NFVO 400. Alternatively or in addition, the memory 404 of the NFVO 400, can be configured to store any requests, resources, information, data, signals, or similar that are described herein. The processing circuitry 402 of the NFVO 400 may be configured to control the memory 404 of the NFVO 400 to store any requests, resources, information, data, signals, or similar that are described herein.

In some examples, the NFVO 400 may optionally comprise a communications interface 406. The communications interface 406 of the NFVO 400 can be for use in communicating with other nodes, such as other virtual nodes. For example, the communications interface 406 of the NFVO 400 can be configured to transmit to and/or receive from other nodes requests, resources, information, data, signals, or similar. The processing circuitry 402 of the NFVO 400 may be configured to control the communications interface 406 of the NFVO 400 to transmit to and/or receive from other nodes requests, resources, information, data, signals, or similar.

Figure 5:
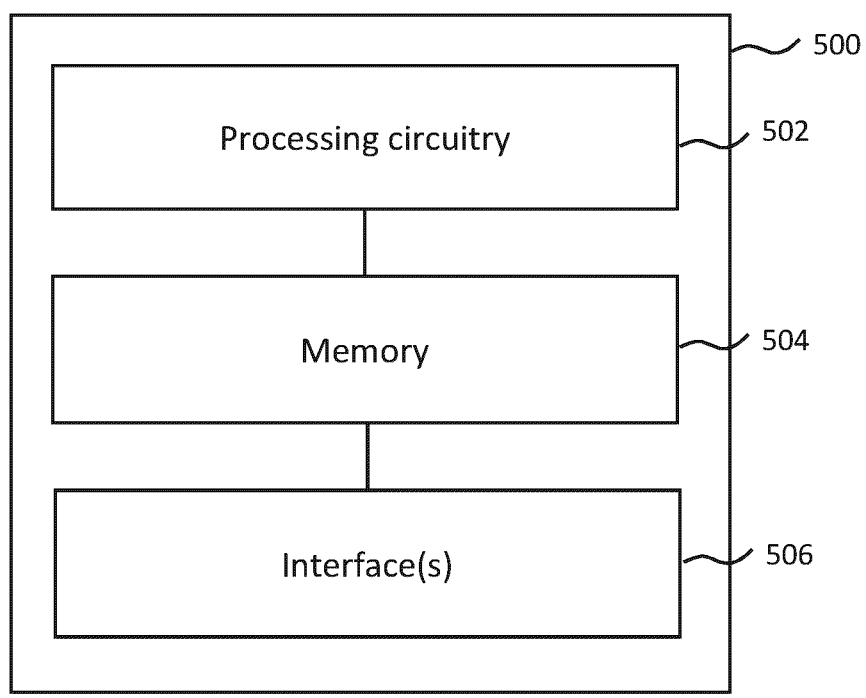
FIG. 5 is a schematic illustration of an example of a VNFM.

FIG. 5 shows a schematic diagram of a VNFM 500 according to embodiments of the disclosure. The VNFM 500 may be configured to perform the method 300 of FIG. 3. The VNFM 500 may be, for example, the VNFM 104 described above in respect of FIG. 1.

The VNFM 500 comprises processing circuitry (or logic) 502. The processing circuitry 502 controls the operation of the VNFM 500 and can implement the method 300 described above with respect to FIG. 3, for example. The processing circuitry 502 can comprise one or more processors, processing units, multi-core processors or modules that are configured or programmed to control the VNFM in the manner described herein. In particular implementations, the processing circuitry 502 can comprise a plurality of software and/or hardware modules that are each configured to perform, or are for performing, individual or multiple steps of the method described herein in relation to the VNFM 500.

Briefly, the processing circuitry 502 of the VNFM 500 is operable to: send, to an NFVO identifying information for at least one VNF instance instantiated at the VNFM in response to registration of one of the NFVO and the VNFM at the other of the NFVO and the VNFM.

Optionally, the VNFM 500 may comprise a machine-readable storage medium (e.g. a memory) 504. In some examples, the memory 504 of the VNFM 500 can be configured to store instructions (e.g. program code) that can be executed by the processing circuitry 502 of the VNFM 500 to perform the method described herein in relation to the VNFM 500. Alternatively or in addition, the memory 504 of the VNFM 500, can be configured to store any requests, resources, information, data, signals, or similar that are described herein. The processing circuitry 502 of the VNFM 500 may be configured to control the memory 504 of the VNFM 500 to store any requests, resources, information, data, signals, or similar that are described herein.

In some examples, the VNFM 500 may optionally comprise a communications interface 506. The communications interface 506 of the VNFM 500 can be for use in communicating with other nodes, such as other virtual nodes. For example, the communications interface 506 of the VNFM 500 can be configured to transmit to and/or receive from other nodes requests, resources, information, data, signals, or similar. The processing circuitry 502 of the VNFM 500 may be configured to control the communications interface 506 of the VNFM 500 to transmit to and/or receive from other nodes requests, resources, information, data, signals, or similar.

By way of example, in the embodiments illustrated in FIGS. 4 and 5 the interfaces 406/506, the processor(s) 402/502, and the memory 404/504 may be connected in series. Alternatively, these components 402/502, 404/504 and 406/506 may be coupled to an internal bus system. The memory 404/504 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 404/504, may include software and/or control parameters. The memory, 404/504, may include suitably configured program code to be executed by the processor(s), 402/502, so as to implement the above-described method.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a Network Functions Virtualization Orchestrator, NFVO, the method comprising:
   receiving, from a Virtual Network Function Manager, VNFM, identifying information for at least one Virtual Network Function, VNF, instance instantiated at the VNFM, wherein the identifying information is received from the VNFM in response to registration of one of the NFVO and the VNFM at the other of the NFVO and the VNFM, and wherein the at least one VNF was instantiated at the VNFM prior to the registration of one of the NFVO and the VNFM; and
   creating a record at the NFVO for the at least one VNF instance identified by the VNFM.

2. The method of claim 1, wherein receiving the identifying information in response to registration of one of the NFVO and the VNFM at the other of the NFVO and the VNFM comprises receiving the identifying information in response to registration of the NFVO at the VNFM.

3. The method of claim 1, further comprising:
   sending a request to the VNFM to identify one or more VNF instances that are instantiated at the VNFM in response to registering the VNFM at the NFVO, wherein receiving the identifying information in response to registration of one of the NFVO and the VNFM at the other of the NFVO and the VNFM comprises receiving the identifying information in response to the VNFM receiving the request from the NFVO.

4. The method of claim 3, wherein sending the request comprises sending a request to the VNFM to identify all VNF instances that are instantiated at the VNFM.

5. The method of claim 1, wherein creating a record at the NFVO for the at least one VNF instance comprises:
   generating a VNF identifier to identify the at least one VNF instance at the NFVO; and
   configuring the record with a mapping between the identifying information received from the VNFM and the VNF identifier generated at the NFVO.

6. A method performed by a Virtual Network Function Manager, VNFM, the method comprising:
   sending, to a Network Functions Virtualization Orchestrator, NFVO, identifying information for at least one Virtual Network Function, VNF, instance instantiated at the VNFM in response to registration of one of the NFVO and the VNFM at the other of the NFVO and the VNFM, and wherein the at least one VNF was instantiated at the VNFM prior to the registration of one of the NFVO and the VNFM.

7. The method of claim 6, wherein sending the identifying information to the NFVO in response to registration of one of the NFVO and the VNFM at the other of the NFVO and the VNFM comprises:
   sending the identifying information in response to registration of the NFVO at the VNFM.

8. The method of claim 6, further comprising:
   receiving a request, from the NFVO, to identify one or more VNF instances that are instantiated at the VNFM in response to registration of the VNFM at the NFVO, wherein sending the identifying information to the NFVO in response to registration of one of the NFVO and the VNFM at the other of the NFVO and the VNFM comprises sending the identifying information in response to receiving the request from the NFVO.

9. The method of claim 8, wherein receiving the request comprises receiving a request from the NFVO to identify all VNF instances that are instantiated at the VNFM.

10. The method of claim 8, wherein the request specifies one or more filters for VNF instances to be identified to the NFVO, and wherein the at least one VNF instance satisfies the one or more filters.

11. The method of claim 10, wherein the one or more filters comprise one or more of the following for the VNF instances to be identified to the NFVO:
    a type of VNF;
    a VNF provider;
    a VNF version;
    a version of a VNF descriptor; and
    a service to be provided using the one or more VNF instances to be identified to the NFVO.

12. A Network Functions Virtualization Orchestrator, NFVO, comprising a processor and a memory, the memory containing instructions executable by the processor such that the NFVO is operable to:
    receive, from a Virtual Network Function Manager, VNFM, identifying information for at least one Virtual Network Function, VNF, instance instantiated at the VNFM, wherein the NFVO is operable to receive the identifying information from the VNFM in response to registration of one of the NFVO and the VNFM at the other of the NFVO and the VNFM, and wherein the at least one VNF was instantiated at the VNFM prior to the registration of one of the NFVO and the VNFM; and
    create a record at the NFVO for the at least one VNF instance identified by the VNFM.

13. The NFVO of claim 12, wherein the NFVO is operable to receive the identifying information in response to registration of one of the NFVO and the VNFM at the other of the NFVO by receiving the identifying information in response to registration of the NFVO at the VNFM.

14. The NFVO of any of claim 12, wherein the memory contains instructions executable by the processor such that the NFVO is operable to:
    send a request to the VNFM to identify one or more VNF instances that are instantiated at the VNFM in response to registering the VNFM at the NFVO, wherein the NFVO is operable to receive the identifying information in response to registration of one of the NFVO and the VNFM at the other of the NFVO by receiving the identifying information for the at least one VNF instance from the VNFM in response to the VNFM receiving the request from the NFVO.

15. The NFVO of claim 14, wherein the memory contains instructions executable by the processor such that the NFVO is operable to send the request by sending a request to the VNFM to identify all VNF instances that are instantiated at the VNFM.

16. A Virtual Network Function Manager, VNFM, comprising a processor and a memory, the memory containing instructions executable by the processor such that the VNFM is operable to:
send, to a Network Functions Virtualization Orchestrator, NFVO, identifying information for at least one Virtual Network Function, VNF, instance instantiated at the VNFM in response to registration of one of the NFVO and the VNFM at the other of the NFVO and the VNFM, and wherein the at least one VNF was instantiated at the VNFM prior to the registration of one of the NFVO and the VNFM.

17. The VNFM of claim 16, wherein the memory contains instructions executable by the processor such that the VNFM is operable to send the identifying information in response to registration of one of the NFVO and the VNFM at the other of the NFVO and the VNFM by sending the identifying information in response to registration of the NFVO at the VNFM.

18. The VNFM of claim 16, wherein the memory contains instructions executable by the processor such that the VNFM is operable to:
receive a request, from the NFVO, to identify one or more VNF instances that are instantiated at the VNFM in response to registration of the VNFM at the NFVO, wherein the VNFM is operable to send the identifying information in response to registration of one of the NFVO and the VNFM at the other of the NFVO and the VNFM by sending the identifying information in response to the VNFM receiving the request from the NFVO.

19. The VNFM of claim 18, wherein the memory contains instructions executable by the processor such that the VNFM is operable to receive the request by receiving a request from the NFVO to identify all VNF instances that are instantiated at the VNFM.

20. The VNFM of claim 18, wherein the request specifies one or more filters for VNF instances to be identified to the NFVO, and wherein the at least one VNF instance satisfies the one or more filters.

21. The VNFM of claim 16, wherein the memory contains instructions executable by the processor such that the VNFM is operable to send identifying information for at least one VNF instance by sending identifying information for at least one VNF instance that had already been instantiated at the VNFM before the request had been received.

22. The VNFM of claim 16, wherein the memory contains instructions executable by the processor such that the VNFM is operable to send identifying information for at least one VNF instance by sending identifying information for at least one VNF instance that had already been instantiated at the VNFM before registration of the NFVO at the VNFM.

* * * * *